United States Patent
Beroth et al.

(10) Patent No.: US 7,500,721 B2
(45) Date of Patent: Mar. 10, 2009

(54) SEAT HEADREST

(75) Inventors: Michael Beroth, Winston-Salem, NC (US); Daniel I. Udriste, Weston, FL (US); Catalin Bunea, Fort Lauderdale, FL (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 11/821,415

(22) Filed: Jun. 22, 2007

(65) Prior Publication Data

US 2008/0315657 A1    Dec. 25, 2008

(51) Int. Cl.
    *A47C 7/38* (2006.01)
(52) U.S. Cl. ............................ 297/410; 297/406
(58) Field of Classification Search .......... 297/397, 297/398, 406, 407, 410
    See application file for complete search history.

(56) References Cited

U.S. PATENT DOCUMENTS

| 4,466,662 | A  | * | 8/1984 | McDonald et al. ........ 297/406 |
| 5,586,810 | A  | * | 12/1996 | Liu .......................... 297/406 |
| 5,967,613 | A  | * | 10/1999 | McKeever ................. 297/397 |
| 6,123,389 | A  | * | 9/2000 | O'Connor et al. .......... 297/397 |
| 6,250,716 | B1 |   | 6/2001 | Clough |
| 6,305,749 | B1 | * | 10/2001 | O'Connor et al. .......... 297/397 |
| 6,467,846 | B2 |   | 10/2002 | Clough |
| 6,601,804 | B2 | * | 8/2003 | Bisch ...................... 297/397 X |
| 6,648,416 | B2 | * | 11/2003 | O'Connor et al. .......... 297/397 |
| 6,666,517 | B2 |   | 12/2003 | Clough |
| 7,040,705 | B2 |   | 5/2006 | Clough |
| 7,080,886 | B2 | * | 7/2006 | Bauer ..................... 297/407 X |
| 7,108,329 | B1 |   | 9/2006 | Clough |
| 7,131,698 | B2 | * | 11/2006 | Dowty et al. ............. 297/391 X |
| 7,201,448 | B2 |   | 4/2007 | Williamson et al. |
| 2002/0093231 | A1 | * | 7/2002 | Estrada et al. ........... 297/410 X |
| 2004/0007910 | A1 |   | 1/2004 | Skelly |
| 2004/0195893 | A1 |   | 10/2004 | Clough |
| 2004/0217639 | A1 |   | 11/2004 | Clough |

* cited by examiner

*Primary Examiner*—Rodney B. White
(74) *Attorney, Agent, or Firm*—Drinker Biddle & Reath LLP

(57) ABSTRACT

A headrest support assembly capable of moving a headrest simultaneously in an up/down and fore/aft position. The headrest support assembly is located in a seat back and includes a headrest frame mounted on a support bracket, the support bracket includes a first and second guide track spaced apart from one another. Each guide track defines a substantially vertical first channel and a curved second channel therein. A first and second support pillar is mounted to the headrest frame. These first and second support pillars are located adjacent to the first and second guide track, respectively. A first and second guide roller is located on each of the first and second support pillars. The first guide roller is positioned within the first channel and the second guide roller is positioned within the second channel of the respective guide tracks.

10 Claims, 6 Drawing Sheets

SEAT HEADREST

FIELD OF THE INVENTION

This invention pertains to a headrest for use with a seating apparatus and, more particularly, a retractable headrest used with a reclining seat.

BACKGROUND OF THE INVENTION

Conventional headrests used with seat backs move up and down to adjust for the sitting height of the person occupying the seats. Traditionally, these headrests were a safety feature mounted on the top of a seat back such that when in the down position they rested on the top of the seat back. When a person having a taller sitting height than the seat back occupies the seat, the person can raise the headrest either manually or electrically so that the headrest is positioned in back of the upper portion of their head as opposed to their neck or lower portion of their head.

As improvements were made to the headrest, wing portions were added that extended from each side of the main headrest. These wing portions could be angled so as to provide support if the seat occupant wanted to lean their head to one side or the other. As additional improvements were made, designers lengthened the seat back so that the headrest fit within and in front of the seat back. This resulted in a more aesthetically pleasing appearance as the tops of the seat backs in a row of seats showed a uniformed flat or rounded top surface.

These later headrests still allowed for an occupant with a greater sitting height than the seat back to raise the headrest so that it rested comfortably against the back of his head. A continuing limitation of this type of headrest is the inability of the headrest to move forward should the occupant want to lean their head forward while in a reclined position.

U.S. Pat. Nos. 6,250,716 and 6,467,846 disclose headrests that move up and down as well as fore and aft and therefore provide a passenger with the ability to tilt their head forward. These headrests, however, are manually activated and do not allow the headrest to move simultaneously in the up/down and fore/aft position. It is for this reason, that an electrically actuated headrest that that simultaneously moves up and down as well as forward and aft would be an important improvement in the art.

BRIEF SUMMARY OF THE INVENTION

The invention involves a retractable headrest support assembly that, when in the stowed position is recessed into the back rest of a chair, in particular, a chair used as a seat in a vehicle and, more particularly, in an aircraft seat. When actuated, the headrest simultaneously moves up and forward out of the seat until it reaches the desired position. When retracted, the headrest moves simultaneously aft and rear until it is fully retracted in the seat back. The headrest support assembly is comprised of a headrest frame mounted on a support bracket, the support bracket includes a first and second guide track spaced apart from one another and located in the seat back with each guide track defining a substantially vertical first channel and a curved second channel therein. A first and second support pillar are mounted to the headrest, said first and second support pillar being located adjacent to the first and second guide tracks, respectively. A first and second guide roller is located on each of the first and second support pillars. These guide rollers are positioned within the first channel and second channel of the respective guide tracks.

DETAILED DESCRIPTION OF THE INVENTION

Figure 1:
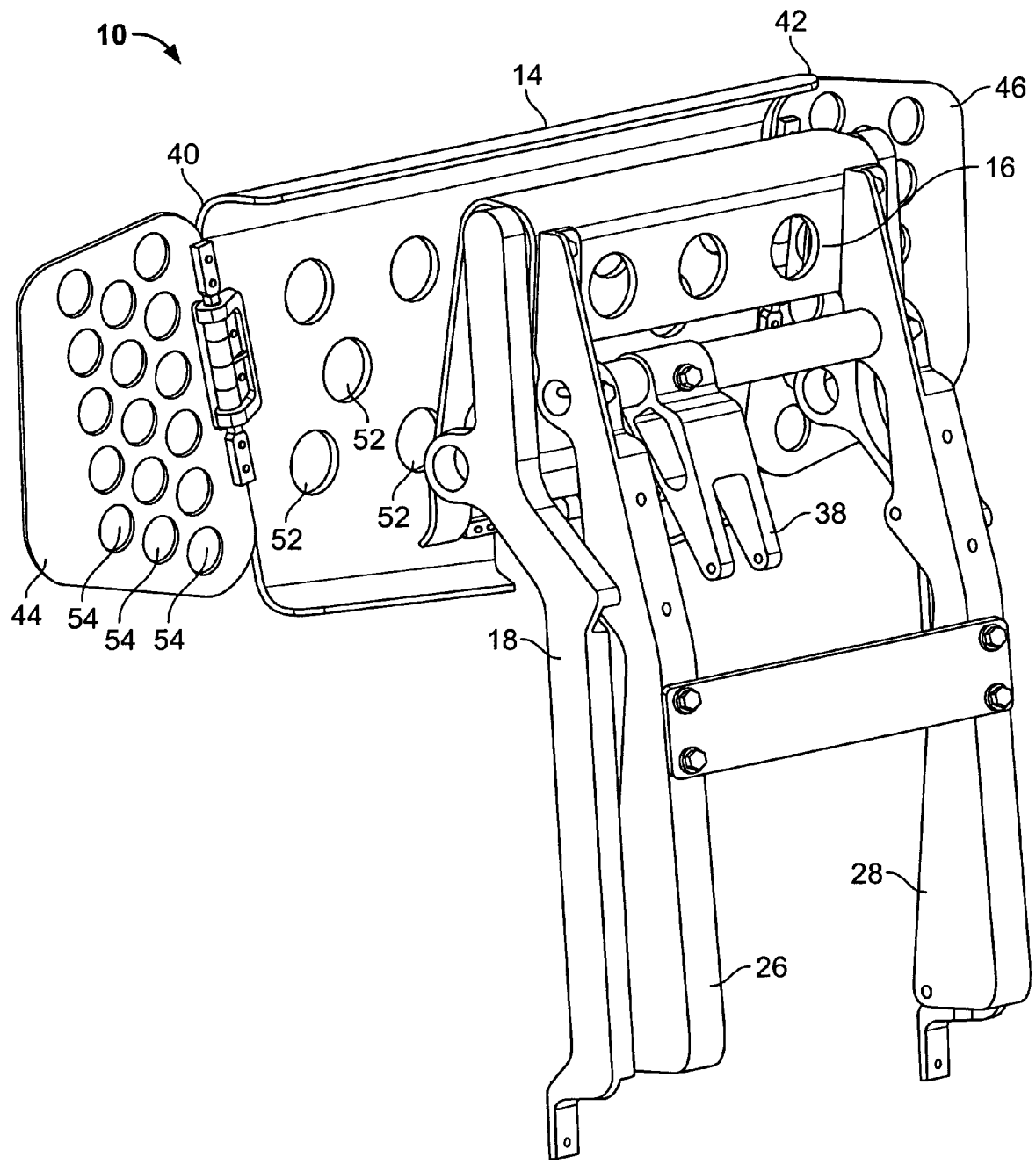
FIG. 1 is a perspective view of the retractable headrest support assembly showing the arrangement between one of the guide tracks and one of the support pillars.
Figure 2:
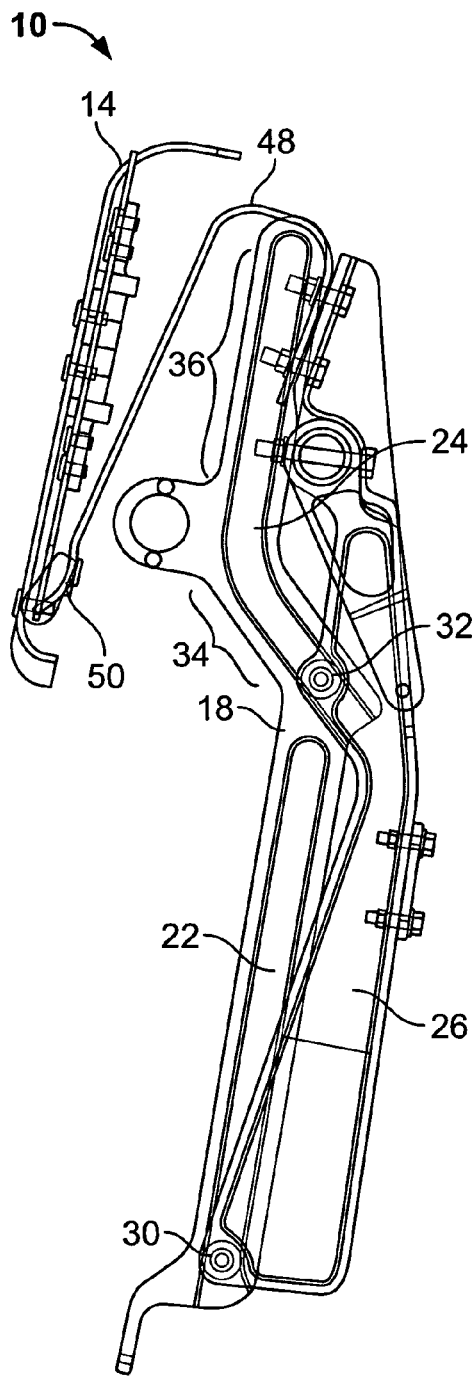
FIG. 2 is a sectional view of the retractable headrest support assembly showing the headrest in a fully retracted position.

The following examples further illustrate the invention but, of course, should not be construed as in any way limiting its scope. The invention is directed to a headrest support assembly 10 located in a seat back 12. As shown in FIGS. 1-6, the headrest support assembly 10 is comprised of a headrest frame 14 mounted on a support bracket 16, the support bracket 16 includes a first and second guide track 18, 20 spaced apart from one another and located in the seat back 12. Each guide track 18, 20 defines a substantially vertical first channel 22 and a curved second channel 24 therein. A first and second support pillar 26, 28 is mounted to the headrest frame 14. These first and second support pillars 26, 28 are located adjacent to the first and second guide track 18, 20, respectively. A first and second guide roller 30, 32 is located on each of the first and second support pillars 26, 28. The first guide roller 30 is positioned within the first channel 22 and the second guide roller 32 is positioned within the second channel 24 of the respective guide tracks 18, 20.

In an embodiment, the second channel 24 in each guide track 18, 20 includes a forward angled portion 34 and a substantially vertical portion 36 located above the angled portion 34. An actuator mounting bracket 38 is located between the first and second support pillar 26, 28 and an electrical actuator (not shown) is mounted to the actuator mounting bracket 38. The electrical actuator can be any one of the known actuators used with electrically movable seats.

In an embodiment, the headrest frame 14 has a first and a second side 40, 42, and a first manually adjustable side wing 44 is attached to the first side 40 of the headrest frame 14 while a second manually adjustable side wing 46 is attached to the second side 42 of the headrest frame 14. The headrest frame 14 may be made of a foam frame or any other suitable material. Furthermore, the headrest frame 14 is mounted to a mounting frame 48 via a constant torque hinge 50. Like the headrest frame 14, the mounting frame 48 may be made of a foam material.

Figure 5:
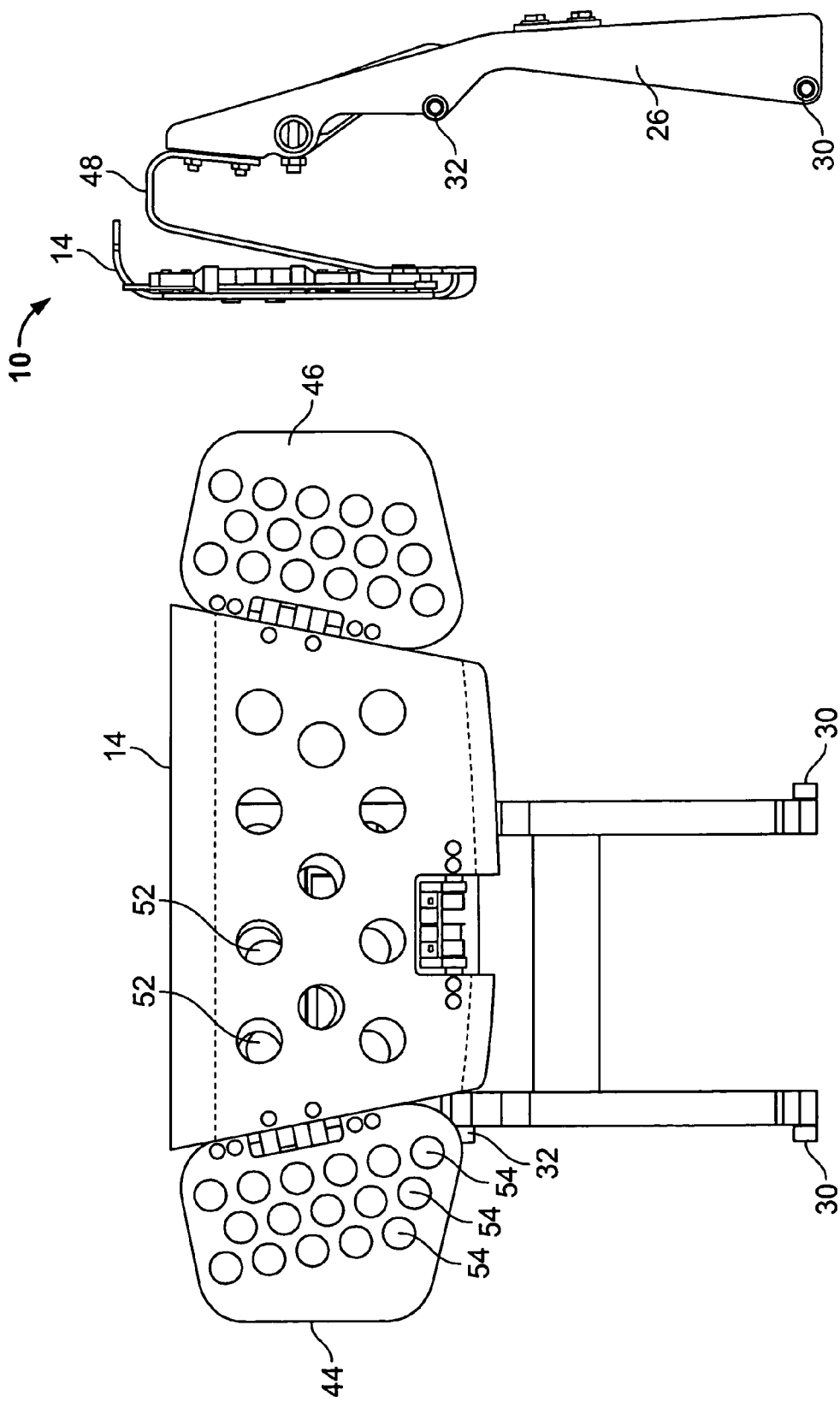
FIG. 5A is a perspective view showing the front of the headrest and side wings with guide tracks not shown.
FIG. 5B is a side view of the headrest and a side support pillar showing the rollers that assist in moving the headrest with the guide tracks not shown.
Figure 6:
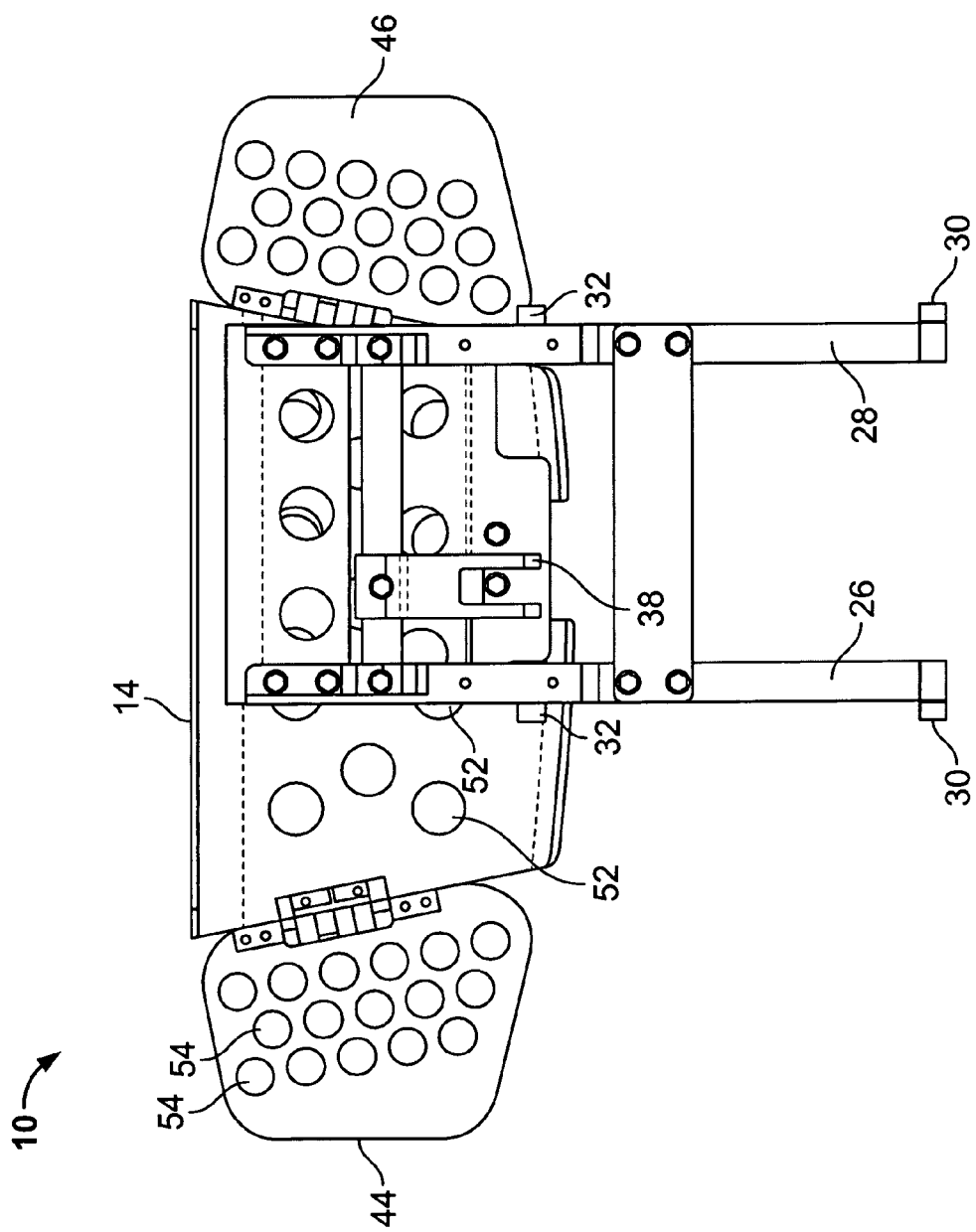
FIG. 6 is a perspective view showing the rear of the headrest and the support pillars with the guide tracks not shown.

In order to optimize the weight of the headrest so as to reduce the load on the actuator, in an embodiment, the headrest frame 14 and the side wings 44, 46 define a plurality of holes 52, 54, as shown in FIGS. 1, 5A, and 6.

Figure 3:
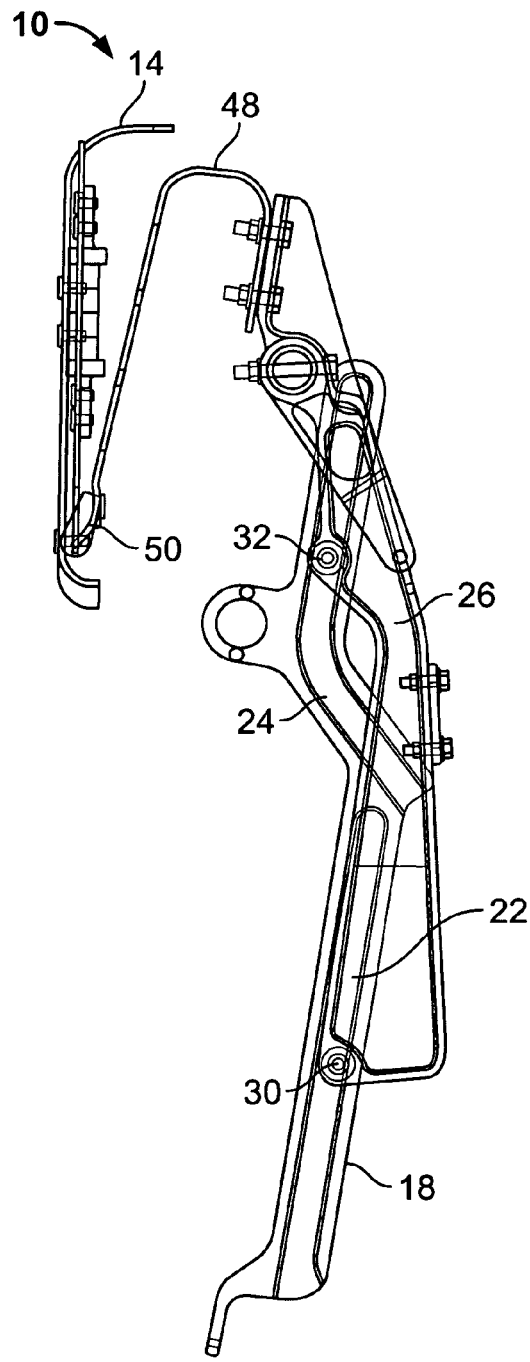
FIG. 3 is a sectional view of the retractable headrest support assembly showing the headrest in a fully extended position.
Figure 4:
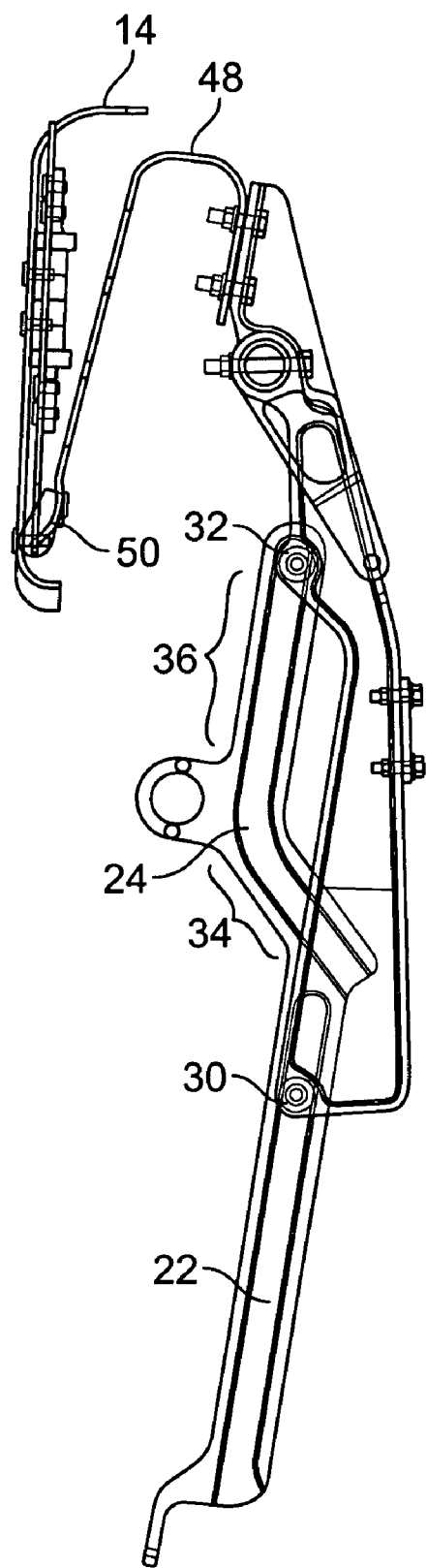
FIG. 4 is a sectional view of the retractable headrest support assembly showing the headrest in a fully extended and fully raised position.
Figure 7:
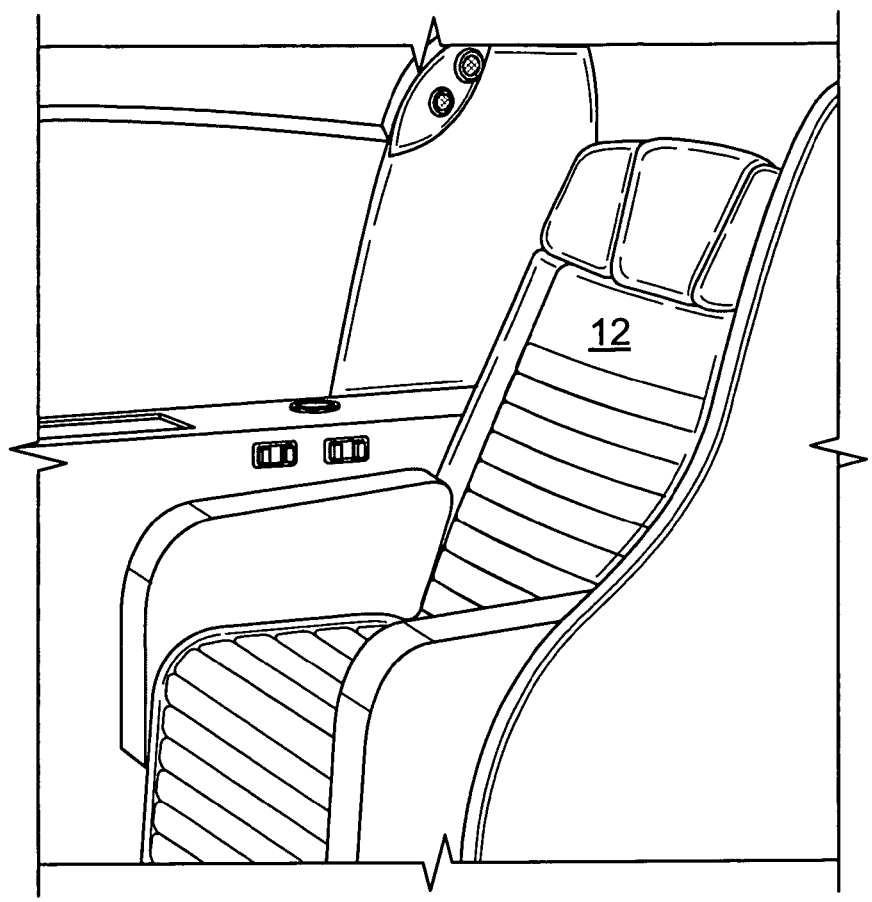
FIG. 7 is a perspective showing a chair with the headrest in a retracted position.
Figure 8:
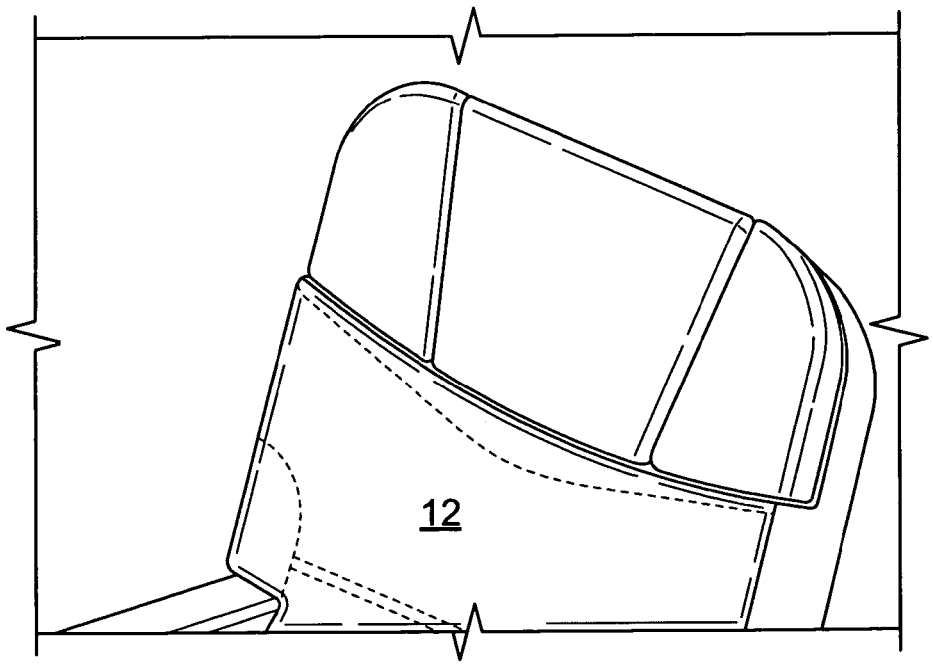
FIG. 8 is a perspective view of the headrest retracted in the chair.

FIG. 3 shows the headrest support assembly 10 in the fully retracted position. When in operation, the seat occupant activates the actuator (not shown) to raise the headrest frame 14 from within the seat back 12, as shown in FIGS. 7 and 8. As the actuator engages the headrest frame 14, it pushes on the actuator mounting bracket 38, thereby causing the first and second rollers 30, 32 to advance simultaneously within the respective first and second channels 22, 24 in each of the guide track. As shown in FIGS. 3-5, because the first channel 22 is substantially vertical, the headrest frame 14 moves in an upward direction. At the same time, the second roller 32 follows the forward angled portion 34 of the second channel 24, thereby causing the headrest frame 14 to move forward. Once the second roller 32 gets to the end of the angled portion 34 of the second channel 24 it tracks through the curve to the substantially vertical portion 36 of the channel 24 thus allowing the headrest frame 14 rise to is full upward position, as shown in FIG. 5.

When the headrest is retracted, the rollers travel in the opposite direction. For example, when the headrest is retracted from the full upward position, both rollers 30, 32 begin moving in the downward direction. Once the second roller 32 reaches the bottom of the substantially vertical portion 36 of the second channel 24, the headrest frame 14 begins to move back into the seat back 12 as the roller 32 follows the curve into the angled portion 34 of the channel 24 while at the same time the first roller 30 continues to move down the first channel 22. This motion continues until the seat occupant disengages the actuator or the rollers 30, 32 reach the end of their respective channels 22, 24.

As shown in FIG. 4, during operation, the headrest may be positioned at any intermediate location between the fully retracted or fully extended position by disengaging the actuator. When this happens, the headrest is locked into position based on the location of the first and second rollers 30, 32 in their respective channels 22, 24.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A headrest support assembly comprised of:
    a headrest frame mounted on a support bracket, the support bracket including a first and second guide track spaced apart from one another, each guide track having a substantially vertical first channel and a curved second channel therein;
    a first support pillar and a second support pillar mounted to the headrest, said first and second support pillar located adjacent to the first and second guide track, respectively; and
    a first guide roller and a second guide roller located on each of the first and second support pillars, said first guide roller positioned within the first channel and said second guide roller positioned within the second channel of the respective guide tracks.

2. The headrest support assembly of claim 1, wherein:
    the second channel in each guide track includes a forward angle portion; and
    a substantially vertical portion located above the angle portion.

3. The headrest support assembly of claim 1 further comprising an actuator mounting bracket located between the first and second support pillar.

4. The headrest support assembly of claim 3, wherein an electrical actuator is mounted to the actuator mounting bracket.

5. The headrest support assembly of claim 1, wherein:
    the headrest has a first and a second side;
    a first manually adjustable side wing is attached to the first side of the headrest; and
    a second manually adjustable side wing is attached to the second side of the headrest.

6. The headrest support assembly of claim 5, wherein each of the first and second side wings define a plurality of holes.

7. The headrest support assembly of claim 1, wherein the headrest frame is a foam frame.

8. The headrest support assembly of claim 1, wherein the headrest frame is mounted to a mounting frame via a constant torque hinge.

9. The headrest support assembly of claim 8, wherein the mounting frame is a foam frame.

10. The headrest support assembly of claim 1, wherein the headrest frame defines a plurality of holes.

* * * * *